Dec. 15, 1953    J. IRTENKAUF ET AL    2,662,438
ORBITAL LATHE FOR MACHINING CRANKSHAFTS
Filed Nov. 21, 1951    4 Sheets-Sheet 1
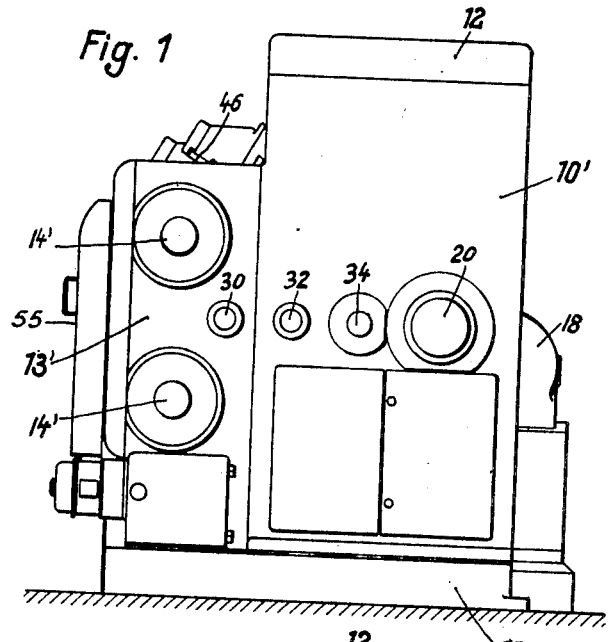
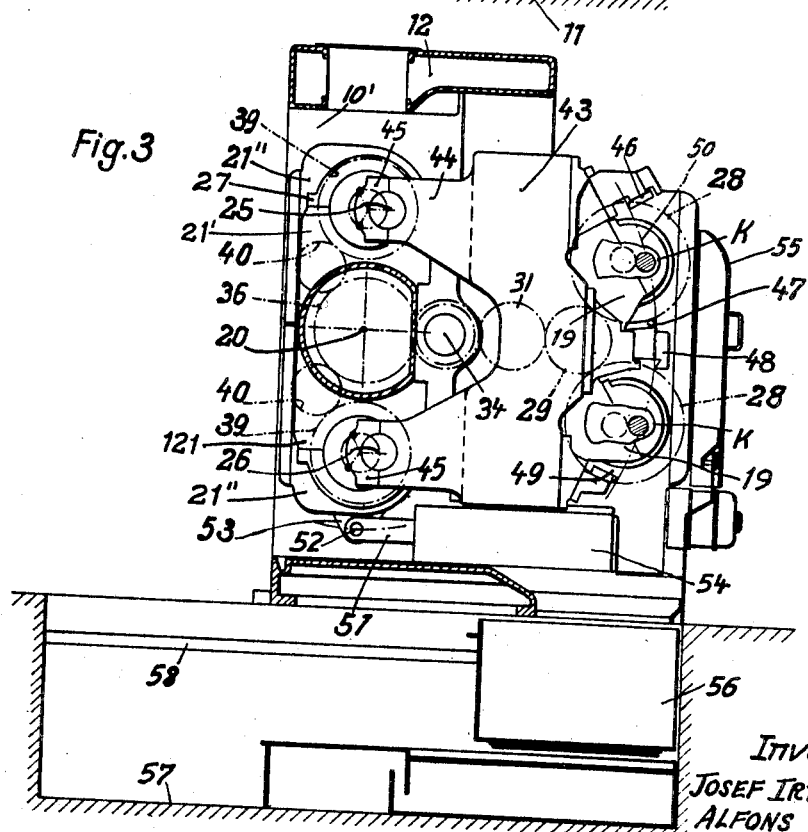
Inventors
JOSEF IRTENKAUF
ALFONS GRUPP
ATTORNEY

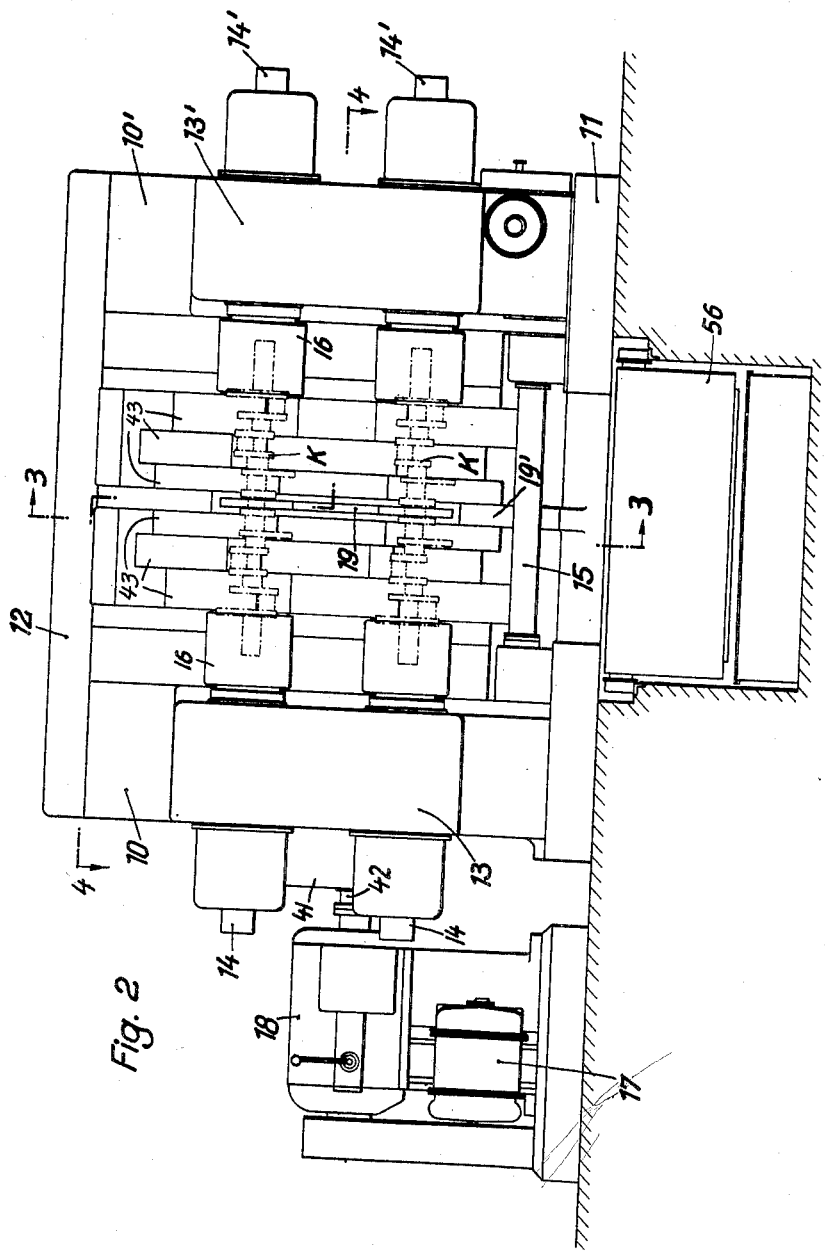

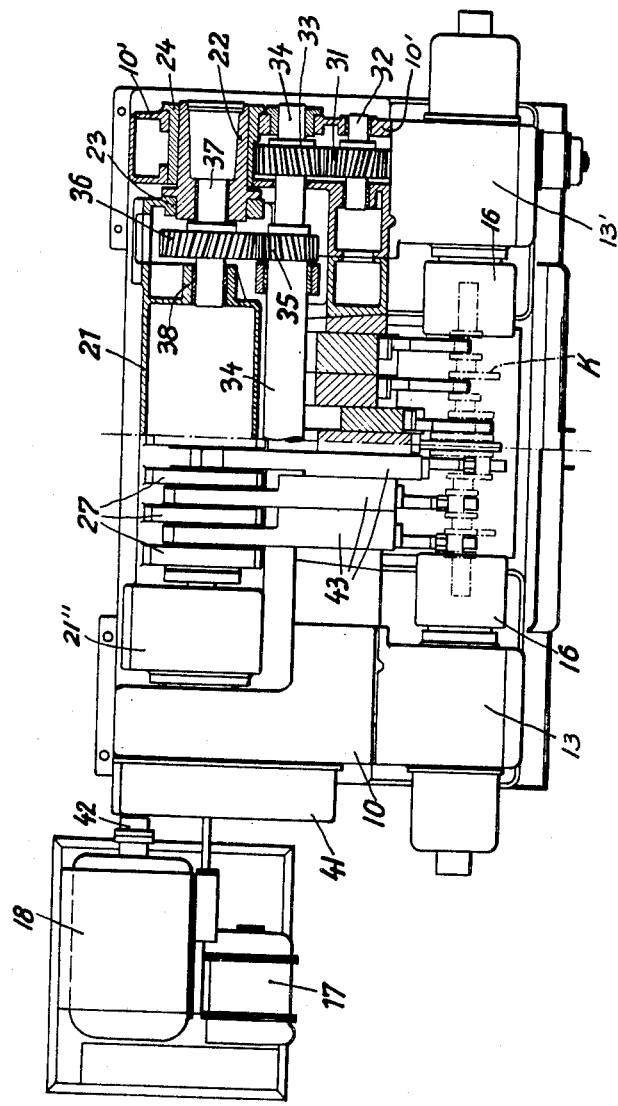

Dec. 15, 1953 J. IRTENKAUF ET AL 2,662,438
ORBITAL LATHE FOR MACHINING CRANKSHAFTS
Filed Nov. 21, 1951 4 Sheets-Sheet 4

Inventor
Josef Irtenkauf
Alfons Grupp
By Herman E. Rackenback
Attorney

Patented Dec. 15, 1953

2,662,438

UNITED STATES PATENT OFFICE 2,662,438

ORBITAL LATHE FOR MACHINING CRANKSHAFTS

Josef Irtenkauf, Goeppingen, and Alfons Grupp, Eislingen (Fils), Germany, assignors to Gebrueder Boehringer G. m. b. H., a limited liability company of Germany Application November 21, 1951, Serial No. 257,588

1 Claim. (Cl. 82—9)

This invention relates to a lathe of the orbital type for machining crankshafts, more particularly for simultaneously machining the crankpins thereof.

It is the object of the present invention to provide an improved orbital lathe capable of simultaneously machining a plurality of crankshafts. Further objects are to provide a lathe in which the crankshafts to be operated upon simultaneously are readily accessible to the operator and permit of any easy inspection of the tools and of their operation. A further object of the invention is the provision of an orbital lathe which may be readily loaded and unloaded with a plurality of crankshaft blanks.

Further objects of the invention will appear from the description of a preferred embodiment thereof and the features of novelty will be pointed out in the claim.

In the drawings in which a preferred embodiment of the invention is illustrated

Fig. 1 is an end view of the machine viewed from the right with respect to Fig. 2;

Fig. 2 is an elevation of the machine viewed from the front;

Fig. 3 is the section taken along the line 3—3 of Fig. 2;

Fig. 4 is a plan view partly shown in section taken along the line 4—4 of Fig. 2.

Figure 5:
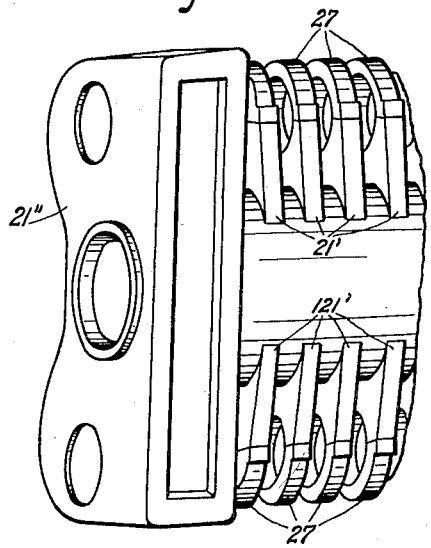
Fig. 5 is a perspective partial illustration of a cradle incorporated in our improved machine.

The frame structure of the machine which carries the movable elements thereof comprises two lateral columns 10 and 10' rigidly connected to a common base plate 11, the tops of the columns 10 and 10' being rigidly connected by a hollow casting 12. On the front face of each column 10, and 10' respectively, there is mounted a pair of headstock housings 13 and 13'. In each of said housings a pair of work spindles 14, or 14' respectively, is journalled one above the other. It will be noted that the work spindles 14 are axially aligned with the work spindles 14'. Moreover, the housings 13 and 13' encase suitable gearings for driving the four work spindles 14 and 14' in synchronism, such gearings being geared to one another by a shaft 15 and adapted to be driven by an electric motor 17. The spindles 14 are equipped with suitable chucks, such as shown at 16, for the attachment thereto of a crankshaft blank K. Similarly, the spindles 14 are equipped with such chucks. Thus, the lathe may be loaded with two blanks K one above the other, both ends of each crankshaft blank being driven in synchronism. In this manner, torsional stresses in the blanks produced by the driving couples are reduced to a minimum. Preferably, a continuously variable transmission 18, such as a fluid drive, is interposed between the electric motor 17 and the headstock gearing, means being provided to automatically control the transmission in dependence on the tool feed for the purpose of automatically varying the rotary speed of the workpieces depending on the variable radial distance of the tools from the blank axes, thus maintaining the cutting speed more or less constant irrespective of the change of such distance.

The central line bearing of each of the two crankshaft blanks is journalled in a stationary support 19, Fig. 1, which is suitably mounted on a rib 19' projecting upwardly from the base 11.

A cradle 21, Figs. 3 and 4, is pivotally mounted on the two columns 10 and 10' to extend therebetween and to be rockable about a horizontal axis 20. To this end, horizontal sleeves 22 are mounted in the columns 10 and 10' co-axially to the axis 20, and the cradle 21 is formed by a casting provided with eyes 23 which engage over and are journalled on the inner ends of the sleeves 22, such inner ends projecting inwardly from the columns 10 and 10'. For the purpose of adjustment, each of the sleeves 22 rests in a bushing 24 inserted in a suitable bore of the column 10'. The outer and inner peripheries of the bushing 24 are excentrically disposed. Therefore, the sleeve 22 may be adjusted with respect to the column 10' by rotation of the bushing 24.

The cradle which is shown separately from the other elements by a perspective partial illustration in Fig. 5 comprises a horizontal tubular casting which is shown in cross section in Fig. 3 and in a longitudinal section in Fig. 4 and is provided with transverse spaced upper fins 21' and lower fins 121' carrying the bearing portions 27 for the master crankshafts. The tubular casting is formed at either end with integral housings 21'' encasing gears referred to hereinafter. Because of the tubular structure the cradle is extremely stiff and adapted to rigidly support the tool supports 43 to be described in detail later on without being liable to be twisted.

Two parallel master crankshafts 25 and 26 are journalled in the bearings formed by the fins 21' and 121' and the bearing portions 27 of the cradle, the axes of such crankshafts being spaced equal distances above and below the rocking axis 20 of the cradle. The master crankshafts have the same throw as the blank crankshafts to be machined. In the embodiment shown, either crankshaft is of the type having six crankpins and seven line bearings and the latter are journalled in the fins 21' and 121' of the cradle. It will appear from Fig. 4 that the fins and bearing portions 27 of the cradle are so spaced as to afford access to the crankpins of the master shafts revolving therebetween.

The crankshafts 25 and 26 and the work spindles 14 and 14' are driven in synchronism. For this purpose, a gear 28 is attached to each end of each work spindle and is located within the associated headstock housing (Fig. 3). The pair of gears 28 encased in each headstock housing meshes with a common pinion 29 carried by a shaft 30 (Fig. 1) journalled in the headstock housing. A pinion 31 attached to a shaft 32 (Figs. 1, 4) extending parallel to shaft 30 and mounted in the column 10, or 10' respectively, meshes with the pinion 29 and with a pinion 33 which is fixed to a shaft 34 extending transversely through the machine and serving the purpose of gearing the headstock transmission in the headstock 13 and the column 10 with the headstock transmission located in the headstock housing 13' and the column 10'.

The shaft 34 which is journalled in the columns 10, 10' is provided with a pair of gears 35, each of which is in mesh with a gear 36 fixed to a shaft 37. One end of shaft 37 is journalled in the sleeve 22 and the other end of shaft 37 is journalled in a bearing 38 integral with the cradle 21, the gear 36 being located between such bearing 38 and the sleeve 22. The gears 36 serve to drive the master crankshafts 25 and 26. To this end, a gear 39 is fixed to either end of each master crankshaft and an intermediate gear 40 suitably journalled in the cradle meshes with both, the gear 36 and the gear 39. In this manner, the two master crankshafts 25 and 26 and the spindles 14 and 14' are driven in synchronism.

In Fig. 4 but one of the two shafts 37 mounted co-axially with the axis 20 is visible. The other shaft 37 extends into a gear casing 41 mounted on the left side of column 10 and is driven through a pair of gears by shaft 42 of the fluid transmission 18.

Figure 6:
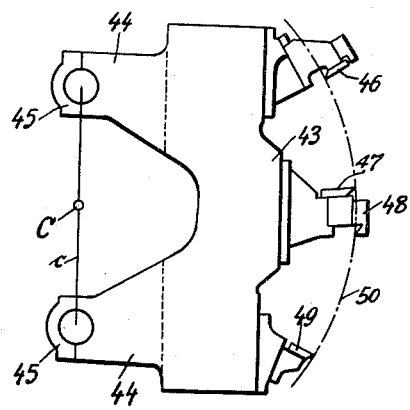
Fig. 6 is a side view of a tool holder.

A plurality of tool supports in form of vertical plates 43 are mounted between the two columns 10 and 10' for orbital motion by means including the two master crankshafts 25 and 26. For this purpose, each of the plates 43 shown separately in Fig. 6 is formed with two rearwardly extending arms 44 of reduced thickness, such arms projecting between the bearing portions 27 of the cradle 21 into contact with the crankpins of the master crankshafts, such crank pins revolving in the spaces between the fins 21' and 121'. Caps 45 are attached to the arms 44 forming bearings therewith journalled on such crankpins. Thus the synchronous rotation of the two master crankshafts imparts an orbital motion to each of the tool supports 43.

Two pairs of cutting tools are mounted on each tool support 43. Each pair is co-ordinated to one of the work axes of the work spindles 14, 14' and comprises two turning tools mounted on opposite sides thereof. Thus, Figs. 3 and 6 show a cutting tool 46 located above the upper blank K and another cutting tool 47 located below the upper blank K. Similarly, there is a tool 48 located above the lower blank K and a tool 49 located below the lower blank K. The cutting edges of the tools 46, 47, 48 and 49 are substantially located on an arc 50 of a circle drawn about a point C located in the center of a line c connecting the bearing axes of the caps 45. Moreover, as shown in Fig. 3, such arc 50 extends through the center of the crankpins K of the blank being operated upon by the tools. As a result, the cutting edges of the tools 46, 47, 48 and 49 are substantially equally spaced from the axis 20, when the cradle is in vertical position. Moreover, it will be appreciated that the two turning tools 46 and 47 are mounted on opposite sides of the upper blank K and that, similarly, the tools 48 and 49 are mounted on opposite sides of the lower blank K. Each of the tools is connected to the support 43 by adjustable means. Since such adjustable means are well known in the art they need not be described in detail.

Means are provided for imparting a reciprocatory feed and withdrawal motion to the tool supports. In the embodiment illustrated in the drawings, such means comprise a mechanism for rocking the cradle about the axis 20. When the cradle is thus rocked in clockwise direction, the upper tools 46 and 48 will be fed towards the blanks into cutting position, while the lower tools 47 and 49 will be withdrawn from the blanks. When the cradle is rocked in anti-clockwise direction, the upper tools 46 and 48 of each of the supports 43 will be withdrawn from cutting position, while the lower tools 47 and 49 will be advanced into cutting position and fed to take the required cut.

When the tools occupy the position shown in Fig. 3 in which the cradle is in its intermediate position, the lathe may be loaded and unloaded.

The mechanism for imparting the rocking motion to the cradle is connected to the latter and to the base 11 and in the embodiment described comprises a link 51 pivotally connected by a pin 52 to an ear 53 provided at the bottom of the cradle 21. The link 51 is connected to a piston not shown mounted for reciprocation within a cylinder 54 attached to the base 11 and adapted to be operated by fluid pressure under control by a suitable valve, adjustable stops being provided to limit the reciprocatory motion of such piston.

The upper tools 46 and 48 may be roughing tools and the tools 47 and 49 may be finishing tools. Alternatively, one of the two sets of tools may operate upon a central region of the crankpins of the blanks, while the other set of tools may machine the ends of the crankpins and the adjacent shoulders and side faces of the crankarms.

The space between the two columns 10 and 10' is closed at the front by a removable apron 55 which will guide the chips downwardly causing them to drop into a box 56 mounted in a pit 57 beneath the machine on guideways 58. When the box 56 is to be emptied, it may be pulled back on the guideways 58 so as to be accessible at the rear of the lathe. In this manner, the removal of the chips will not disturb the operator standing in front of the lathe.

From the foregoing description it will be appreciated that we have provided a lathe of rugged construction which may be easily loaded and unloaded and will permit the operator to closely inspect the tools during the operation for easy control; that the master crankshafts are so well journalled and supported within the bearing portions 27 of the cradle 21 as to be safely held against any deflection thus imparting a very accurate orbital motion to the various tool supports which operate simultaneously upon all of the crankpins of the two blanks; that during the rocking motion of the cradle 21, the gears 40 being journalled in the cradle, will roll upon the gear 36 thus avoiding any interference of the rocking motion with the transfer of rotary motion from the shafts 37 to the master crankshafts; and that the machine is of a comparatively simple and inexpensive design.

While we have described our invention with reference to a preferred embodiment thereof, we wish it to be clearly understood that same is not limited to the details thereof but is capable of numerous modifications within the scope of the appended claim.

What we claim is:

An orbital lathe comprising a frame composed of a base, of two spaced columns thereon, and of a casting rigidly connecting the tops of said columns, a cradle mounted between and pivotally connected to said columns for rocking motion about a horizontal axis and including a tubular casting having upper and lower fins, two master crankshafts of identical shape journalled in said fins of said cradle and extending parallel to said axis equally spaced therefrom, one of said crankshafts being located above and the other one below said axis, a plurality of tool supports each formed by a vertical plate having two spaced rearwardly extending arms, each of said arms being journalled on crankpins of said crankshafts and being thereby adapted upon rotation of said crankshafts to perform an orbital motion, one pair of parallel horizontal work spindles journalled in one of said columns, another pair of work spindles aligned with said first pair journalled in the other one of said columns, all of said work spindles being equally spaced from said axis, chucking means on said work spindles for attaching two crankshaft blanks thereto for rotation about two parallel work axes, means for gearing said spindles and at least one of said crankshafts for synchronous rotation, two pairs of cutting tools mounted on each of said tool supports, each such pair being co-ordinated to and arranged to embrace one of said work axes, the cutting edges of said tools being substantially equally spaced from said axis, and means mounted on said frame and connected to said cradle and adapted to impart to the latter a rocking motion in either direction for the purpose of feeding and withdrawing said cutting tools towards and from said work axes.

JOSEF IRTENKAUF.
ALFONS GRUPP.

References Cited in the file of this patent

UNITED STATES PATENTS

| Number | Name | Date |
|---|---|---|
| 1,456,028 | Marx | May 22, 1933 |
| 1,934,530 | Groene | Nov. 7, 1933 |
| 2,138,964 | Groene | Dec. 6, 1938 |
| 2,232,324 | Groene | Feb. 18, 1941 |
| 2,264,458 | Siekmann | Dec. 2, 1941 |